United States Patent [19]

Lipstein

[11] 4,247,262
[45] Jan. 27, 1981

[54] LIQUID FEEDING AND MIXING ARRANGEMENT INCLUDING A FLOW-SHIELDING EJECTOR THERMAL SLEEVE

[75] Inventor: Norman J. Lipstein, Schenectady, N.Y.

[73] Assignee: General Electric Company, Schenectady, N.Y.

[21] Appl. No.: 973,133

[22] Filed: Dec. 26, 1978

[51] Int. Cl.³ .............................................. F04F 5/00
[52] U.S. Cl. .................................. 417/54; 60/644; 165/70; 165/108; 165/134 R; 176/38; 176/65; 417/176
[58] Field of Search .................. 165/70, 108, 134; 60/644; 417/54, 76, 173, 176, 179, 151; 176/38, 61, 65

[56] References Cited

U.S. PATENT DOCUMENTS

| | | | |
|---|---|---|---|
| 3,154,140 | 10/1964 | Esselman et al. | 417/173 |
| 3,380,649 | 4/1968 | Roberts | 417/164 |
| 3,628,879 | 12/1971 | Marmon et al. | 417/176 |
| 3,640,645 | 2/1972 | Forsythe | 417/176 X |
| 4,168,071 | 9/1979 | Jacobson et al. | 277/15 X |

FOREIGN PATENT DOCUMENTS 1208588 10/1970 United Kingdom ................ 60/644

*Primary Examiner*—Carlton R. Croyle
*Assistant Examiner*—Edward Look
*Attorney, Agent, or Firm*—Robert R Schroeder; James C. Davis, Jr.; Paul R. Webb, II

[57] ABSTRACT

An improved arrangement for feeding a cool liquid into a pressure vessel and mixing the fed liquid with hot liquid contained therein includes a flow-shielding ejector thermal sleeve disposed partially within an inlet nozzle and surrounding a supply line through which the main feed flow is conducted to a sparger outlet port in the vessel. The sleeve is spaced radially inwardly from the inner surface of the nozzle to define a generally annular flow-through space therebetween. Cool leakage liquid flow is confined within the sleeve and ejected by the main feed flow from an ejector chamber formed around the port by a downstream portion of the sleeve. The ejective action of the main flow exiting the port additionally draws an insulating flow of hot liquid from the vessel sequentially upstream through the flow-through space, into the interior of the upstream portion of the sleeve, and downstream with the confined cool leakage flow, thereby substantially reducing cracking of the nozzle.

9 Claims, 3 Drawing Figures

LIQUID FEEDING AND MIXING ARRANGEMENT INCLUDING A FLOW-SHIELDING EJECTOR THERMAL SLEEVE

The present invention relates to an improved arrangement for feeding a feed liquid into a pressure vessel and mixing the liquid with vessel-contained liquid, wherein a flow-shielding ejector thermal sleeve is provided.

BACKGROUND OF THE INVENTION

In a number of industrial processes a relatively cool feed liquid is fed into a vessel and mixed with relatively hot liquid therein. Examples include heat exchangers and steam generators. For example, in a steam generator such as a boiling water nuclear reactor, the heat source is a nuclear fuel core contained in a pressure vessel. Arrangements for effecting the feeding and mixing are well known in the art.

One type of such arrangement includes an inlet conduit connected to the vessel by an inlet nozzle. A sparger disposed within the vessel has at least one outlet port adapted to introduce the feed liquid as a high-velocity jet into the body of liquid in the vessel. A sparger supply line is disposed within the nozzle and places the inlet conduit in flow communication with the sparger so that feed liquid is conducted from the inlet conduit to and through the outlet port. The outer surface of at least a portion of the supply line is spaced from the inner surface of the nozzle to define therebetween an annular cavity opening into the vessel. (Such sparger supply lines are sometimes referred to in the art as "thermal sleeves.") In the prior art arrangements various seals have been employed between an upstream portion of the supply line and the nozzle in attempting to provide arrangements wherein the relatively cool feed liquid is confined within the sparger supply line. Typically, however, such seals have been imperfect, whereby an amount of the feed liquid leaks past the seal. This leakage flow, which as indicated above is relatively cool, flows through the annular cavity adjacently along the inner surface of the nozzle and enters the vessel-contained liquid body adjacent the downstream end of the nozzle, e.g. at the nozzle blend radius. In such arrangements after varying periods of use, cracks have been discovered along the inner surface and blend radius of the inlet nozzle. These cracks are believed to result from thermal cycling of the inner portion of the nozzle by alternate exposure to the hot water or other liquid in the vessel and to the relatively cooler feed water or water cooled by the feed water.

An improvement of the above-described arrangement is described by Sheer, Jr. in U.S. patent application Ser. No. 927,384, filed July 24, 1978, assigned to the assignee hereof and incorporated herein by reference. That improvement includes an ejector thermal sleeve having an upstream portion disposed within the annular cavity. The upstream portion circumferentially surrounds, and is spaced from, a downstream portion of the sparger supply line. The upstream sleeve portion is sealed to the inlet nozzle to substantially preclude leakage flow into the vessel along the downstream end of the nozzle. A downstream portion of the ejector thermal sleeve in flow communication with the upstream portion thereof circumferentially surrounds, and is spaced from, the sparger outlet port in liquid-ejecting register therewith to define an ejector chamber opening into the vessel. In operation, feed liquid leakage flow is confined to the interior of the ejector thermal sleeve and ejected from the chamber by and with the feed liquid flow exiting through the outlet port.

Although the improved arrangement of Sheer, Jr. is a substantial advance in the art, further improvements are desirable for further reducing the foregoing cracking problem.

This problem is discussed in greater detail in copending application of Jacobson et al., U.S. Ser. No. 887,471, filed Mar. 17, 1978, now U.S. Pat. No. 4,168,071 assigned to the assignee hereof and incorporated herein by reference. That application describes a thermal isolator arrangement which offers one approach to substantially eliminating thermal cycling of the inner portion of the inlet nozzle and resulting thermal cracking thereof. The present invention is neither disclosed nor suggested by the referenced applications.

It has now been found, by practice of the present invention, that the improved arrangement described in the referenced Sheer, Jr. application can be further improved by elimination of the seal between the inlet nozzle and the ejector thermal sleeve without loss of control of the feed liquid leakage flow path. The ejective action of the main flow of the feed liquid exiting through the outlet port additionally draws an insulating flow of hot liquid from the pressure vessel sequentially upstream through a radially outer portion of the annular cavity (i.e. the portion lying radially outwardly of the ejector thermal sleeve and radially inwardly of the nozzle), into the interior of the upstream portion of the sleeve and downstream with the leakage flow therethrough, the liquid drawn from the vessel being returned thereto through the ejector chamber.

DESCRIPTION OF THE INVENTION

Generally stated, the present invention provides in one aspect thereof an improvement over the above-described Sheer, Jr. arrangement. In this improvement the portion of the ejector thermal sleeve within the nozzle is spaced inwardly from the inner surface thereof to define a generally annular flow-through space. The upstream and downstream ends of the space are open, and the space is free of means (e.g. seals) which either impede or substantially preclude liquid flow therethrough. The downstream end of the space is in flow communication with the vessel for receiving a flow of relatively hot liquid therefrom. The upstream end of the space is in flow communication with the interior of the upstream portion of the ejector thermal sleeve.

Despite elimination of the seal employed by Sheer, Jr. between the inlet nozzle and the ejector thermal sleeve, at least a substantial portion of the liquid leakage flow is confined to the interior of the sleeve and ejected from the chamber by and with the feed liquid flow exiting through the outlet port. Moreover, the above-mentioned ejector-induced flow of hot liquid through the radially outer portion of the annular cavity (i.e. the flow-through space) still further minimizes thermal cycling of the inner surface of the nozzle and further reduces thermal cracking thereof.

In another aspect, generally stated, this invention provides an improved process for feeding a feed liquid into a body of liquid contained in a pressure vessel and mixing the feed liquid with the liquid body.

BRIEF DESCRIPTION OF THE DRAWING

Practice of the present invention will be better understood by having reference to the following detailed description taken in conjunction with the accompanying drawing, which illustrates the best mode of carrying out the invention.

In the drawing, wherein like numerals refer to similar elements throughout.

DETAILED DESCRIPTION OF THE INVENTION AND MANNER AND PROCESS OF MAKING AND USING IT

Figure 1:
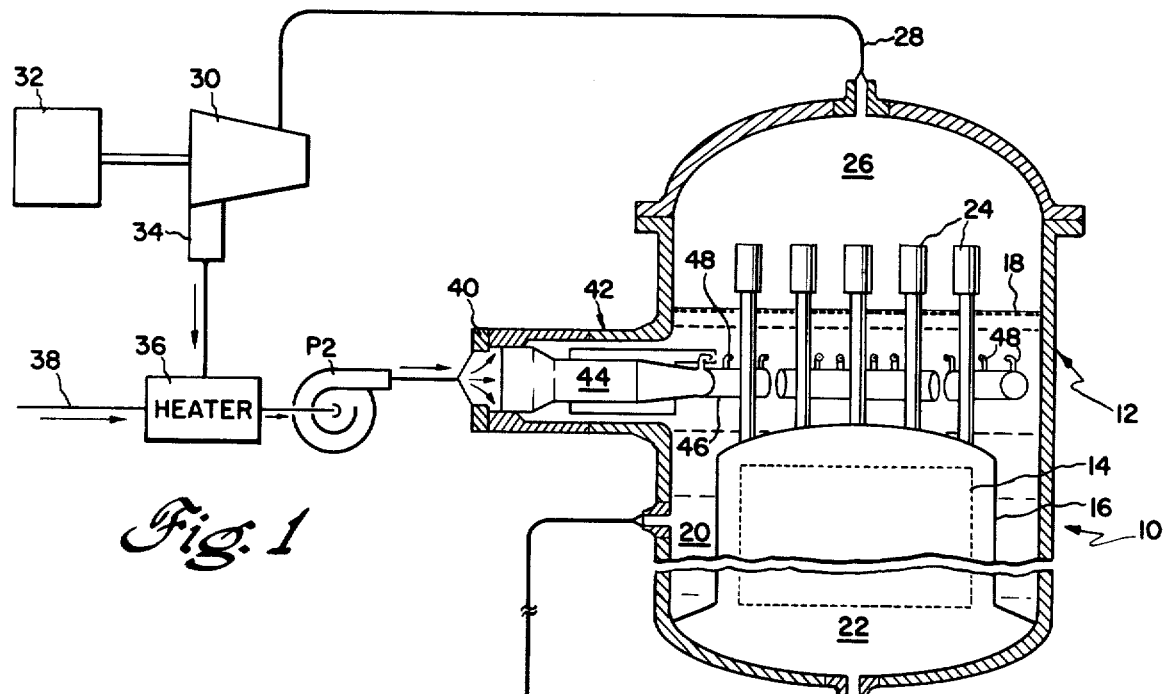
FIG. 1 is an elevation view, partly in section, schematically illustrating a steam generating system including the improved arrangement of this invention as a component thereof.

Referring now to the drawing, FIG. 1 illustrates steam generating system 10, including pressure vessel 12, within which is housed heat source 14 (indicated by dashed lines) which may be, for example, a nuclear reactor core, i.e., the vessel is a boiling water nuclear reactor. The heat source is surrounded by shroud 16 and the vessel is filled to a level indicated by line 18 with a vaporizable working liquid, e.g. water. The water is circulated through the heat source by pump P1 which takes water from annulus 20 and pressurizes lower plenum 22, whereby water is forced through the heat source and a portion of the water is vaporized. The resulting hot steamwater mixture passes through a plurality of steam separators 24. The steam is collected in upper plenum 26 while the separated hot water returns to the vessel-contained circulating water body. Steam is taken from the upper plenum through steam line 28 and applied to a utilization device such as turbine 30 which drives electrical generator 32. The turbine exhaust steam is condensed in condenser 34 and thereafter the condensed steam is returned as feed water to the vessel through one or more feed water heaters 36 and pump P2. Make-up water may be received by the feed water heater through line 38 from a suitable source (not shown).

In the improved arrangement of the present invention, the feed water is received from pump P2 through inlet conduit or feed water pipe 40. Inlet nozzle 42 is connected (as by welding) as a reinforcing transition member between pipe 40 and the vessel wall. Removably fitted, as by an interference fit, into the inlet nozzle is sparger supply line 44, the downstream end of which is connected in flow communication with arcuate sparger segment 46 of a segmented feed water distribution sparger ring. The feed water passed through the supply line exits the sparger segment through a series of holes, which may be outlet ports in the free ends of elbow-shaped sparger nozzles 48, whereby the feed water is distributed as high-velocity jets into, and thereby mixed with, the water circulating in the vessel. (Similar inlet nozzle and sparger supply line arrangements, not shown, supply feed water to the other sparger segments of the sparger ring.)

Figures 2, 3:
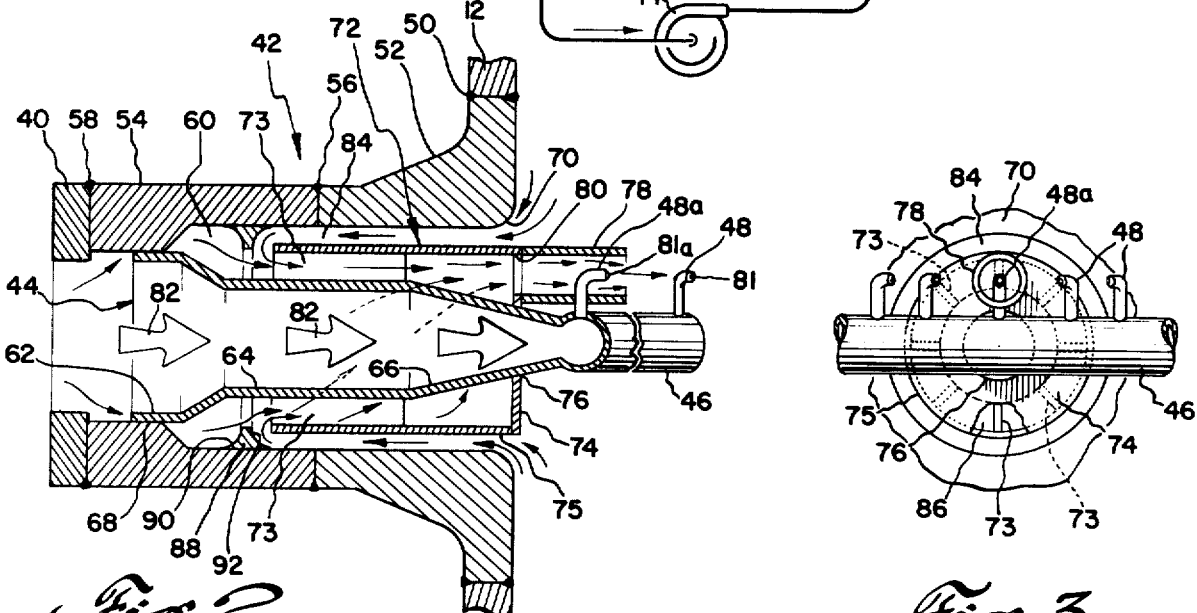
FIG. 2 is an enlarged sectional view, illustrating the improved arrangement in greater detail.
FIG. 3 is a side view of a portion of the downstream end of the improved arrangement.

The improved liquid feeding and mixing arrangement is shown in greater detail by the enlarged view of FIG. 2. As seen therein, the inlet nozzle 42 is welded to the wall of the vessel 12 by weld 50. The nozzle 42 includes a main portion 52 welded to an outer portion 54 by weld 56. The outer portion of the nozzle is welded to the feed water pipe 40 by weld 58. Sparger supply line 44, which is preferably removably disposed within the inlet nozzle 42, places the inlet conduit 40 in flow communication with the sparger segment 46 disposed within vessel 12, whereby feed liquid can be conducted from the inlet conduit to and through the outlet ports of sparger nozzles 48. The outer surface of the supply line is spaced from the inner surface of the nozzle 42 to define annular cavity 60 therebetween. Supply line 44 preferably includes partly tapered upstream portion 62, midstream portion 64 and tapered downstream portion 66 joining the sparger segment 46. The free end of upstream portion 62 is supported in cantilevered manner by the outer portion 54 of nozzle 42 and forms interference fit or imperfect seal 68 therewith as heretofore known.

In a related prior art arrangement not including the improved ejector thermal sleeve of the present invention, leakage flow through an imperfect seal (such as seal 68) between a sparger supply line (e.g. line 44) and an inlet nozzle (e.g. nozzle 42) typically passed through a cavity (such as cavity 60) along the cavity-defining surface of the nozzle and entered the liquid body in the vessel through the open end of the cavity proximate a nozzle blend radius (e.g. blend radius 70). In such arrangements, thermal cycling associated with flow fluctuations in the circulating body of water and in the leakage flow results in cracking of the inlet nozzle principally at the blend radius. Although, the foregoing cracking problem is substantially reduced by including the sealed ejector thermal sleeve of Sheer, Jr. in the arrangement, this problem can be still further reduced in accordance with the present invention by flow-shielding ejector thermal sleeve 72 having an upstream portion thereof disposed within, and opening upstream into, the cavity 60. The upstream sleeve portion circumferentially surrounds, is spaced from, and preferably is concentric with, that downstream portion of supply line 44 located downstream of the transverse plane defined by the upstream end of the sleeve.

The improved feeding-and-mixing arrangement preferably includes means for suppressing vibration of the ejector thermal sleeve. A preferred vibration suppression means is illustrated by a plurality of radially spaced apart lands or supports 73 disposed between, and interconnecting, the sparger supply line and the upstream portion of the sleeve, whereby the supply line supports the sleeve in cantilevered manner. The radially inner and outer surfaces of the supports may be connected by any suitable technique, e.g. welding, to the opposing surface regions of the supply line and the sleeve, respectively. Although eight supports 73 are shown (in full or hidden view) in FIG. 3, any suitable number of supports may be included. Equidistant spacing between the supports is preferred.

The ejector thermal sleeve includes generally annular plate 74 disposed transversely of the axis thereof at a downstream end of the upstream portion of the sleeve. Optionally included seal 76, which may be a weld, may be formed between an inner circumference of the plate and the region of the sparger supply line adjacent thereto, whereby the supply line can further support the ejector thermal sleeve.

The ejector thermal sleeve terminates at a downstream end thereof in smaller sleeve portion 78 which projects from plate 74 having hole 80 provided therein for flow communication of the smaller downstream sleeve portion with the portion of the ejector thermal sleeve upstream of the plate. The downstream sleeve portion circumferentially surrounds sparger outlet port 81a of sparger nozzle 48a, to define an ejector chamber, i.e. the downstream sleeve portion is in liquid-ejecting register with the outlet port. For greater leakage ejection efficiency, the downstream sleeve portion is preferably disposed generally coaxially with the outlet port and with the downstream end portion of the elbow-shaped sparger nozzle. The downstream sleeve portion preferably extends downstream beyond the outlet port for further enhancing the leakage ejection efficiency. For maximum reduction of nozzle cracking, the downstream sleeve portion is directed or extended away from the nozzle (as illustrated). The extent to which such sleeve portion should be so directed increases with decreasing distance between the nozzle and the chamber outlet.

As used in this description and in the claims which follow, the terms "downstream" and "upstream" refer to locations or directional senses toward the right and toward the left, respectively, in FIG. 2.

The portion of the ejector thermal sleeve 72 within the nozzle 42 is spaced radially inwardly from the inner surface thereof to define generally annular flow-through space 84 therebetween, the space being a part of the cavity 60. The upstream and downstream ends of the flow-through space are open, and the space is free of means (e.g. seals) which either impede or substantially preclude liquid flow therethrough. The downstream end of the flow-through space is in flow communication with the vessel for receiving a flow of relatively hot liquid therefrom, as schematically indicated by the arrows closest to the blend radius 70 (FIG. 2). The upstream end of the flow-through space is in flow communication with the interior of the upstream portion of the ejector thermal sleeve. Preferably, the latter flow communication is direct flow communication along an unrestricted flow path extending around the upstream end of the sleeve. The nature of the flow-through space is such that a flow of liquid (e.g. hot water) from the interior of the vessel is drawn sequentially upstream through the flow-through space, into and downstream through the interior of the ejector thermal sleeve, and ejected from the ejector chamber 78 by and with the feed liquid flow exiting through the outlet port 81a. The flow of hot liquid upstream through space 84 is an insulating or shielding flow in that it thermally insulates or shields the radially inner surface of the inlet nozzle 42 from the cooler sleeve 72, which is cooled by the leakage flow (i.e. that portion of the feed liquid which passes seal 68). In the absence of one-way flow-through the space 84, the liquid therin would be at a lower temperature, which typically and harmfully would undergo erratic fluctuations as a result of replacement in whole or in part from time to time by the hot liquid circulating within the vessel 12. Such temperature fluctuations and nozzle cracking resulting therefrom are at least substantially eliminated by the improved arrangement of this invention.

The ratio of the longitudinal extent of the flow-through space 84 to the radial width thereof is preferably at least 1:1 when the extent and width are measured in the same units.

In operation of this improved arrangement, the cool main feed flow received via the inlet conduit and nozzle enters and flows through sparger supply line 44 as indicated by large arrows 82, exiting therefrom into sparger segment 46 and being distributed thereby to sparger nozzles 48. As used herein, the term "main feed flow" means the total feed flow less the feed leakage flow. The main feed flow is passed from the sparger nozzles through the outlet ports thereof (e.g. port 81) into the vessel-contained liquid body in the form of high-velocity jets, which aid in mixing the feed with the hotter liquid body. The main flow exiting through the outlet port 81a of sparger nozzle 48a creates suction within small projecting sleeve 78. This suction draws the relatively cool leakage flow from cavity 60 through the upstream portion of the ejector thermal sleeve 72, through sleeve opening 80 and into the interior of the chamber defined by small sleeve 78. The cool leakage flow is ejected from the chamber by, and with, the main flow into the vessel-contained liquid body. By this arrangement the leakage flow is confined within the generally annular zone defined by the interior surface of the ejector thermal sleeve and the outer surfaces of the structure which it surrounds. The confined leakage flow is introduced from this zone into the liquid body in a region spaced downstream from the end 70 of the inlet nozzle at substantially the same distance as the chamber-exiting main flow. The leakage flow is thus diverted from contacting the inlet nozzle.

The suction or ejective action provided by the main flow of the feed liquid exiting through the outlet port 81a additionally draws an insulating flow of hot liquid from the pressure vessel sequentially upstream through the flow-through space 84, around the upstream end of the sleeve 72, into the interior of the upstream portion of the sleeve (through spaces 86 between supports 73) and downstream with the leakage flow therethrough. The liquid drawn from the vessel is returned thereto through the ejector chamber. Such additional flow still further minimizes thermal cycling of the inner surface of the nozzle and further reduces thermal cracking thereof.

In the preferred use in a boiling water nuclear reactor, the feedwater inlet arrangement may be subject to the following typical conditions: The vessel pressure is about 1000 to about 1200 psi (e.g. about 1100 psi) and the temperature of the water therein is about 500° F. to about 550° F. (e.g. about 525° F.). The pressure of the feedwater in the inlet pipe 40 is about 15 to about 25 psi greater than the vessel pressure. The temperature of the feedwater varies from about 70° F. to about 420° F. (e.g. from about 100° F. to about 300° F.) depending upon operating conditions. The leakage flow and the hot liquid insulating flow will each ordinarily be a minor part of the total feed water, i.e. from about 1% or less to about 25% (e.g. about 15%) thereof. For such preferred application, the vessel wall and the main portion 52 of the nozzle are preferably formed of low alloy steel, the welds in which should be post-weld heat treated. The ejector thermal sleeve, the outer portion of the nozzle and the inlet pipe are preferably formed of carbon steel, the welds in which do not require post-weld heat treatment. Thus, weld 58 for example may conveniently be made in the field without such heat treatment.

The present feed-and-mixing arrangement preferably further includes means for stabilizing the interface of (a) the flow of feed liquid which has leaked past the imperfect seal 68 into the annular cavity 60 and (b) the flow of liquid drawn from the vessel 12 through the flow-through space 84. A preferred interface stabilizing means is annular flow-dividing member 88 protruding radially inwardly from the radially inner surface of the inlet nozzle and terminating in a radially inner periphery spaced from and surrounding the sparger supply line 44. The flow-dividing member is spaced upstream from the upstream end of the sleeve 72 and downstream from the imperfect seal 68. The radially inner periphery of the flow-dividing member is preferably larger in diameter than the largest diameter of the sparger supply line 44, thereby facilitating removal or replacement of the supply line. The upstream and downstream surfaces 90 and 92, respectively, of the flow-dividing member are tapered and preferably concavely arcuate as illustrated.

BEST MODE CONTEMPLATED

The best mode contemplated for carrying out this invention has been set forth in the above description (and illustrated in the accompanying drawing), for example by way of setting forth preferred operating conditions and materials of construction for the preferred application of the feed-and-mixing arrangement.

It is to be understood that the foregoing detailed description is given merely by way of illustration and that numerous modifications may be made therein without departing from the spirit or scope of the present invention.

What is claimed is:

1. In an arrangement for (a) feeding a feed liquid into a pressure vessel adapted to contain a body of liquid and (b) mixing the feed liquid with the liquid body contained in the vessel, said arrangement including:
   (A) an inlet conduit,
   (B) an inlet nozzle connecting said conduit to said vessel,
   (C) a sparger disposed within the vessel and having at least one outlet port adapted to introduce the feed liquid as a high velocity jet into the liquid body,
   (D) a sparger supply line disposed within said nozzle and placing said inlet conduit in flow communication with said sparger so that feed liquid is conducted from said inlet conduit to said outlet port via said line, at least a portion of the outer surface of said supply line being spaced radially inwardly form the inner surface of said nozzle to define therebetween an annular cavity opening into said vessel,
   (E) an imperfect seal formed between an upstream portion of said supply line and said nozzle whereby an amount of said feed liquid leaks past said seal into said annular cavity,
   (F) an ejector thermal sleeve having an upstream portion thereof disposed within and opening upstream into said annular cavity, said upstream sleeve portion circumferentially surrounding and being spaced from a downstream portion of said sparger supply line, a downstream portion of said ejector thermal sleeve being in flow communication with the upstream portion thereof, said downstream sleeve portion being spaced from and circumferentially surrounding said outlet port in liquid-ejecting register therewith to define an ejector chamber opening downstream into said vessel,
   the improvement comprising the portion of said ejector thermal sleeve within said nozzle being spaced inwardly from said inner surface of said nozzle to define therebetween a generally annular flow-through space open at both its upstream and downstream ends, said flow-through space being free of means impeding or substantially precluding liquid flow therethrough, said downstream end of said flow-through space being in flow communication with said vessel for receiving liquid therefrom, said upstream end of said flow-through space being in flow communication with the interior of said upstream portion of said ejector thermal sleeve, the nature of said flow-through space being such that a flow of liquid from the interior of said vessel is drawn sequentially upstream through said flow-through space, into and downstream through the interior of said ejector thermal sleeve, and ejected from said chamber by and with the feed liquid flow exiting through said outlet port.

2. The arrangement of claim 1, wherein said upstream end of said flow-through space is in flow communication with the interior of said upstream portion of said ejector thermal sleeve along a flow path extending around the upstream end of said sleeve.

3. The arrangement of claim 2, further including means for stabilizing the interface of (a) the flow of feed liquid which has leaked past said imperfect seal into said annular cavity and (b) the flow of liquid drawn from said vessel through said flow-through space.

4. The arrangement of claim 3, wherein said interface stabilizing means is an annular flow-dividing member protruding radially inwardly from the radially inner surface of said nozzle and terminating in a radially inner periphery spaced from and surrounding said sparger supply line, said member being spaced upstream from said upstream end of said sleeve and downstream from said imperfect seal.

5. The arrangement of claim 4, wherein said radially inner periphery of said flow-dividing member is larger in diameter than the largest diameter of said sparger supply line.

6. The arrangement of claim 1, wherein the ratio of longitudinal extent of said flow-through space to the radial width thereof is at least 1:1 when said extent and width are measured in the same units.

7. The arrangement of claim 1, further comprising means for suppressing vibration of said ejector thermal sleeve.

8. The arrangement of claim 7, wherein said means is a plurality of radially spaced apart supports disposed between, and interconnecting, said sleeve and said sparger supply line.

9. In a process for (a) feeding a feed liquid into a pressure vessel containing a body of liquid which is hotter than the feed liquid and (b) mixing the feed liquid with the liquid body, wherein (A) a main flow portion of the feed liquid is conducted in a downstream direction sequentially through (1) a supply line disposed within the cavity of, and provided with an imperfect seal to, an inlet nozzle connected to the vessel and (2) a feed liquid distribution member within the liquid body and having at least one outlet port spaced from and directed away from said nozzle such that said main flow portion exits through the port as a high-velocity jet into the liquid body, (B) another portion of the feed liquid forms a leakage flow past said imperfect seal and along said nozzle, (C) a member defining a confined leakage flow zone within said cavity is provided, (D) said leakage flow is drawn through said zone by suction created by said jet in a downstream portion of said zone disposed in liquid-ejecting register with said port, and (E) said leakage flow is ejected with the main flow exiting said port, the improvement comprising (F) said zone-defining member being spaced inwardly from the inner surface of said nozzle to define therebetween a generally annular flow-through space open at both its upstream and downstream ends, said flow-through space being free of means impeding or substantially precluding liquid flow therethrough, said downstream end of said flow-through space being in flow communication with said body of liquid, said upstream end of said flow-through space being in flow communication with the upstream portion of said zone, (G) drawing a flow of liquid from said body of liquid sequentially upstream through said flow-through space and into and downstream through said zone by said jet-created suction, and (H) ejecting the liquid flow drawn in step G with the main and leakage flows exiting through said outlet port.

* * * * *